A. HUPP.
AUTOMATIC MAIL EXCHANGE SYSTEM.
APPLICATION FILED MAY 31, 1913.
1,170,267.
Patented Feb. 1, 1916.
8 SHEETS—SHEET 6.
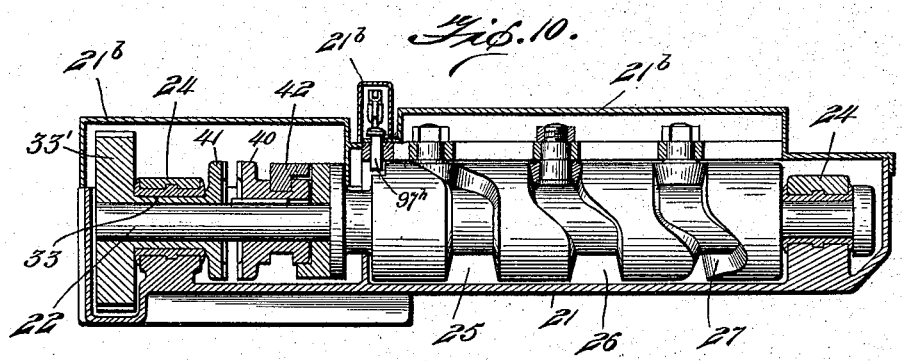
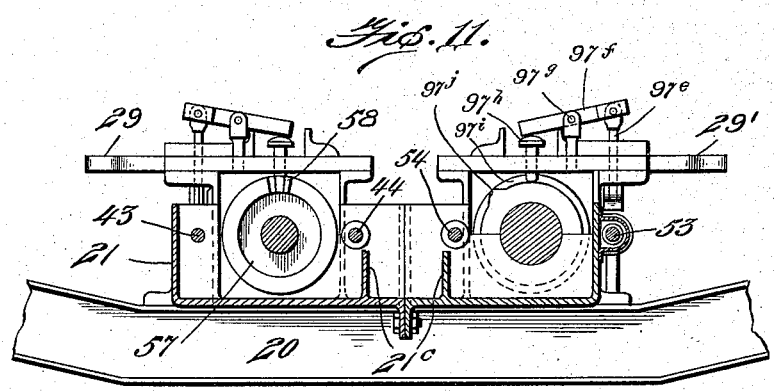
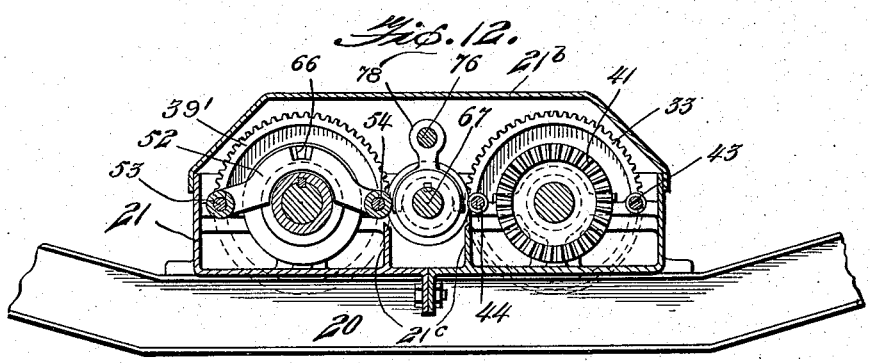

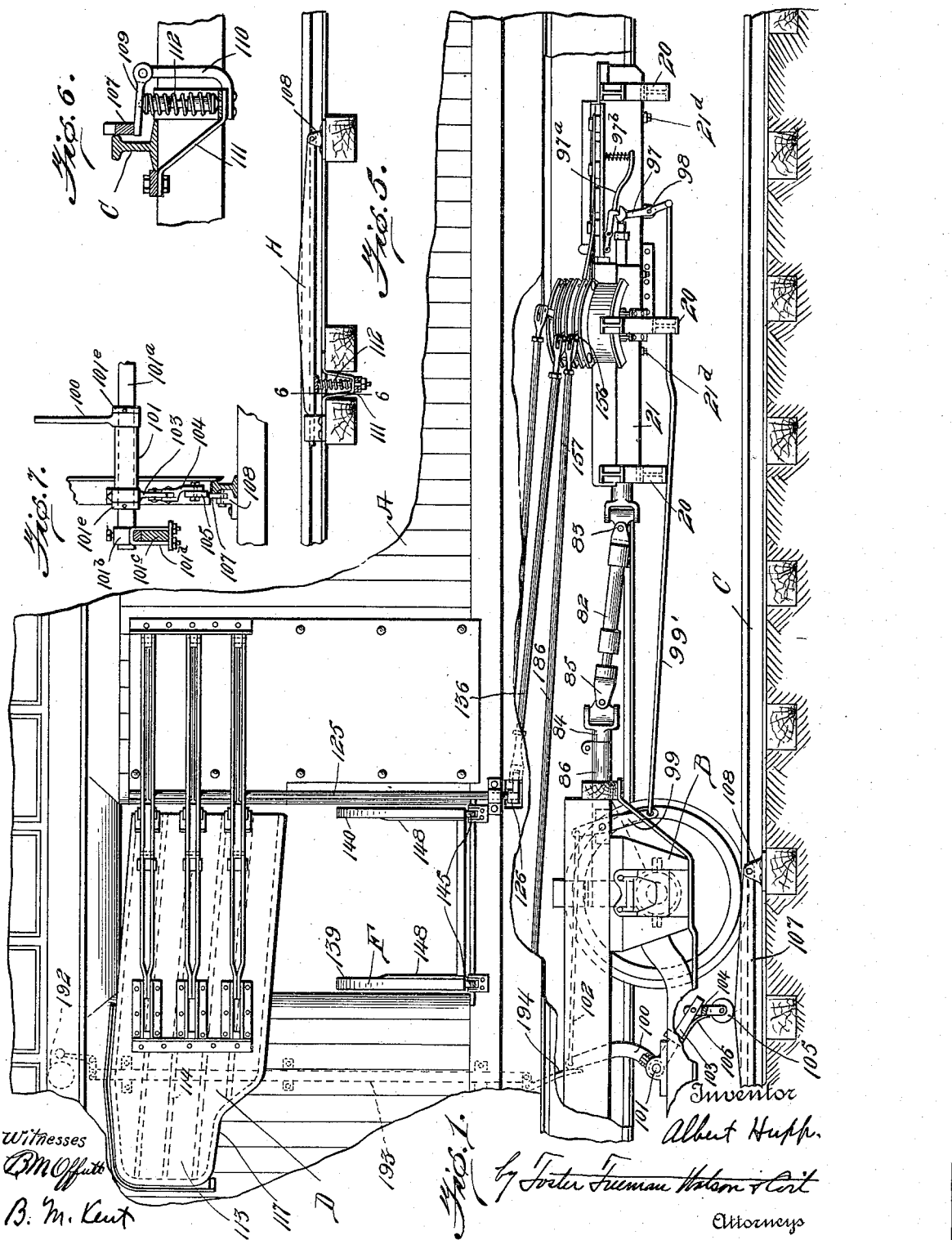

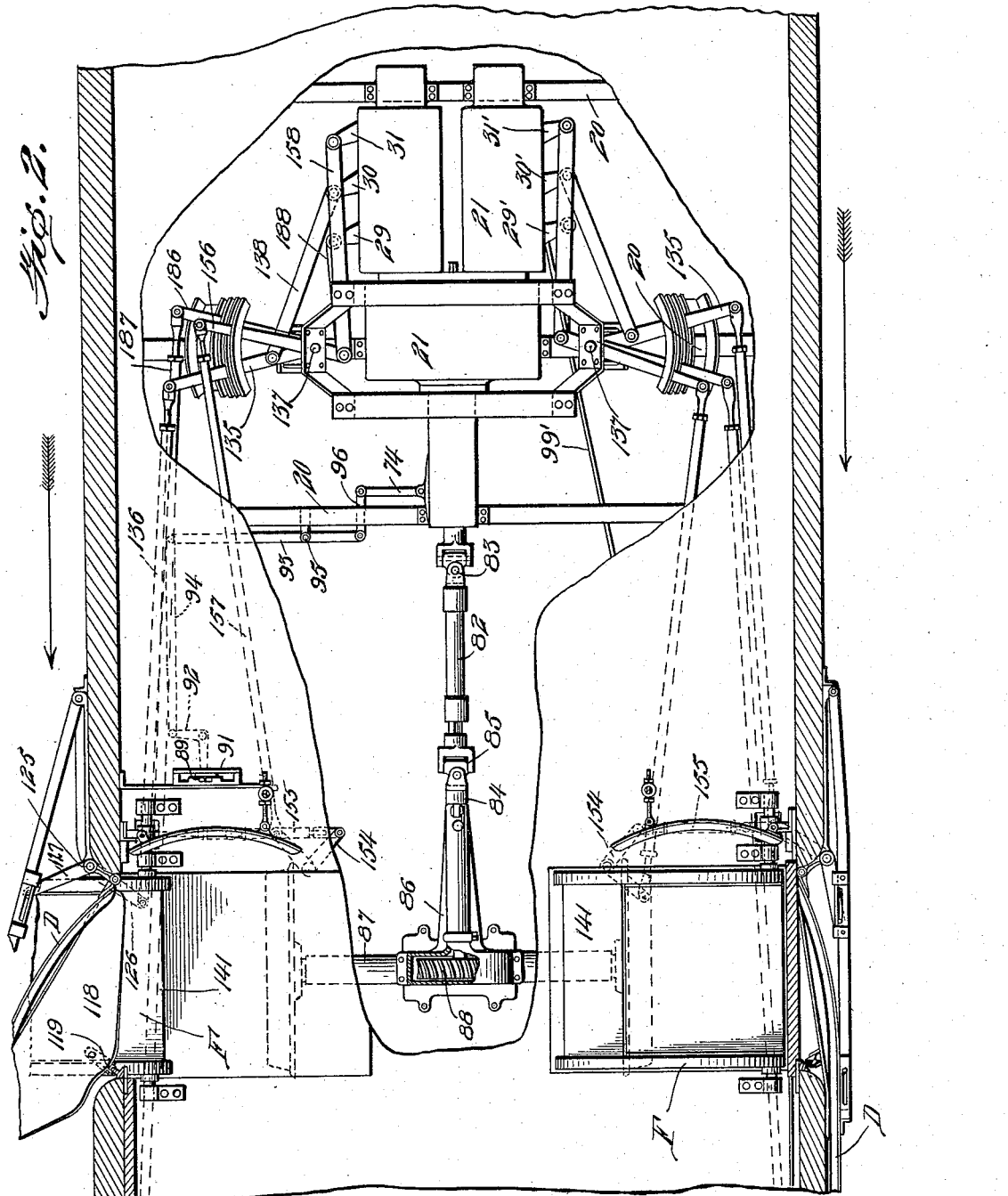

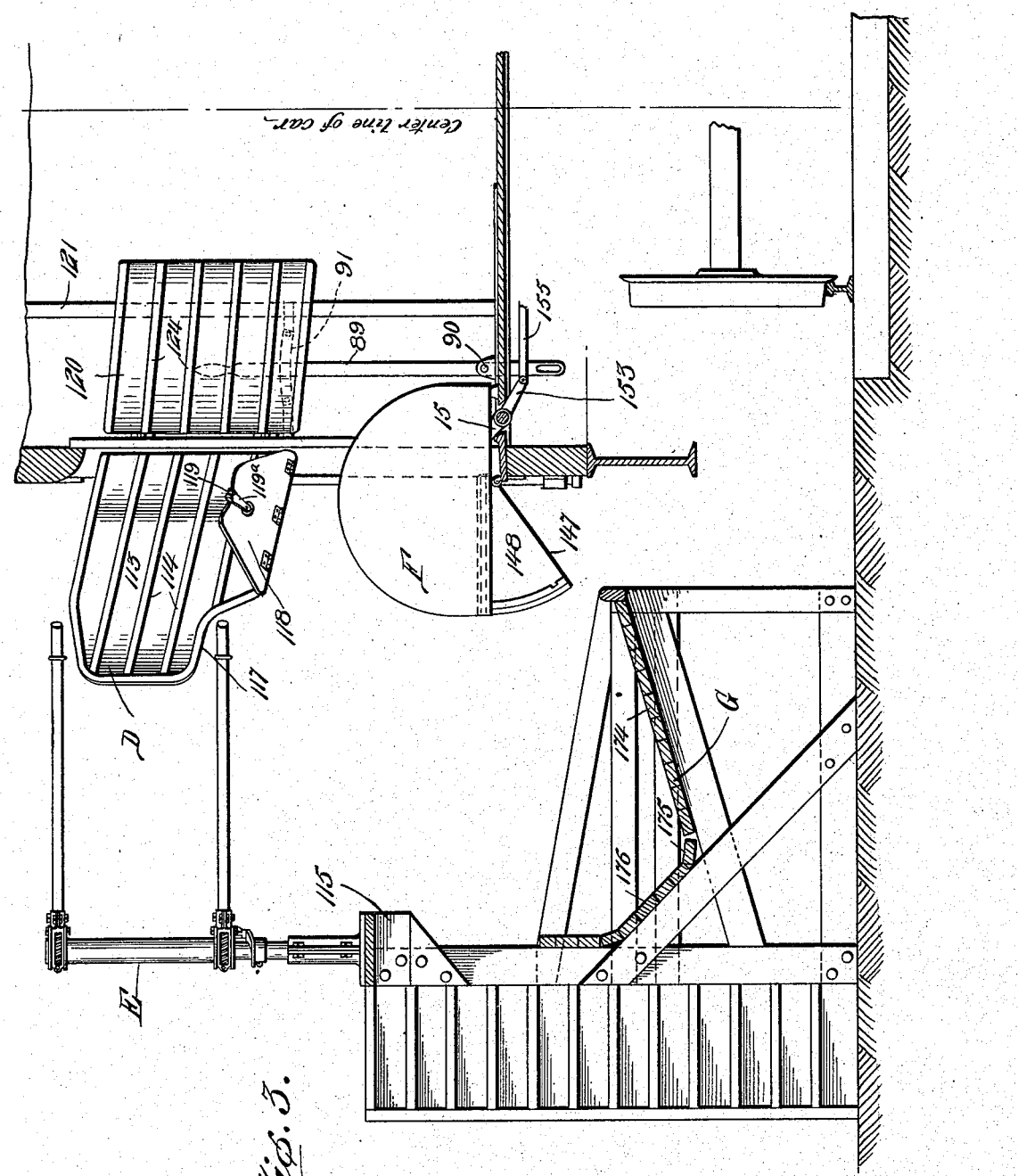

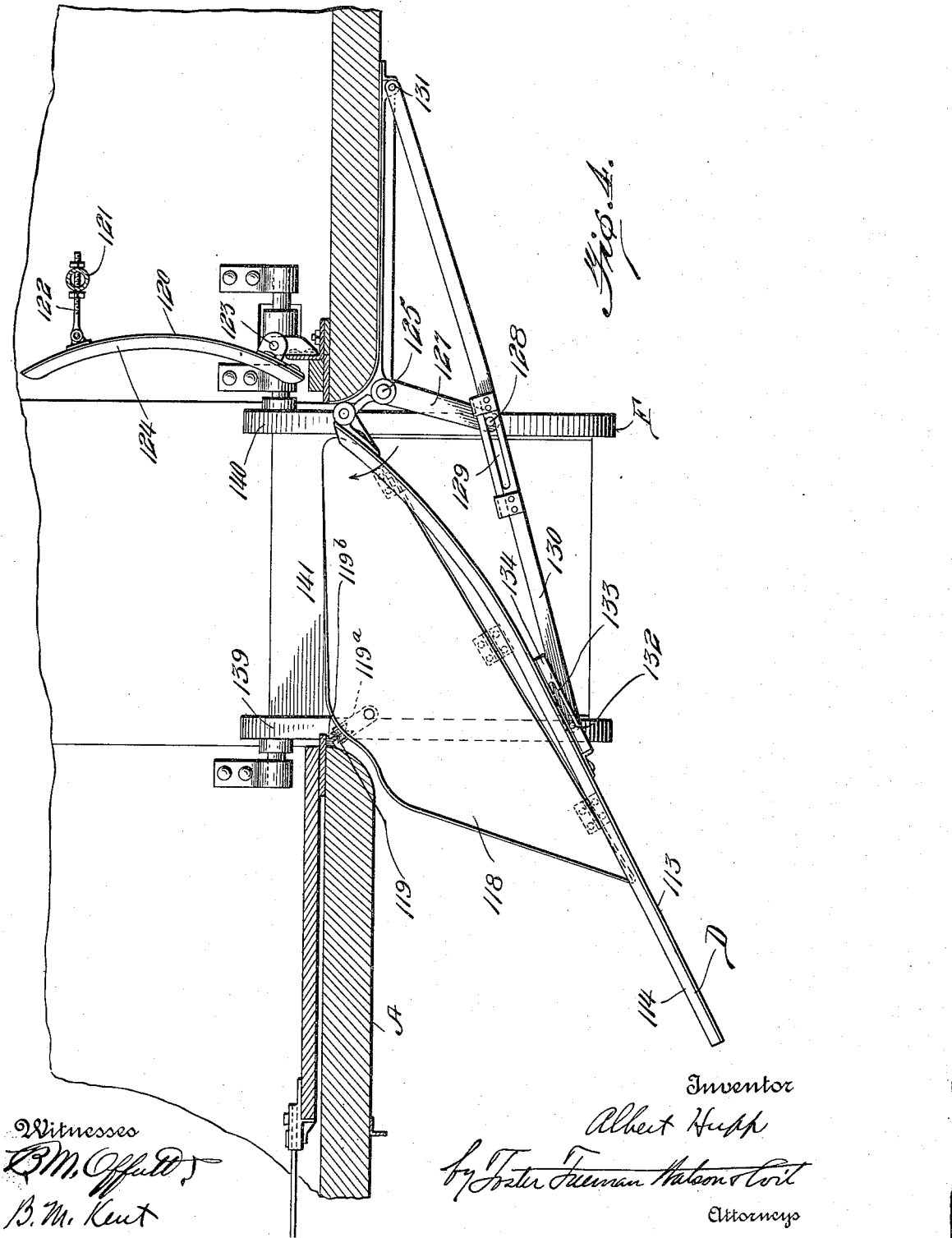

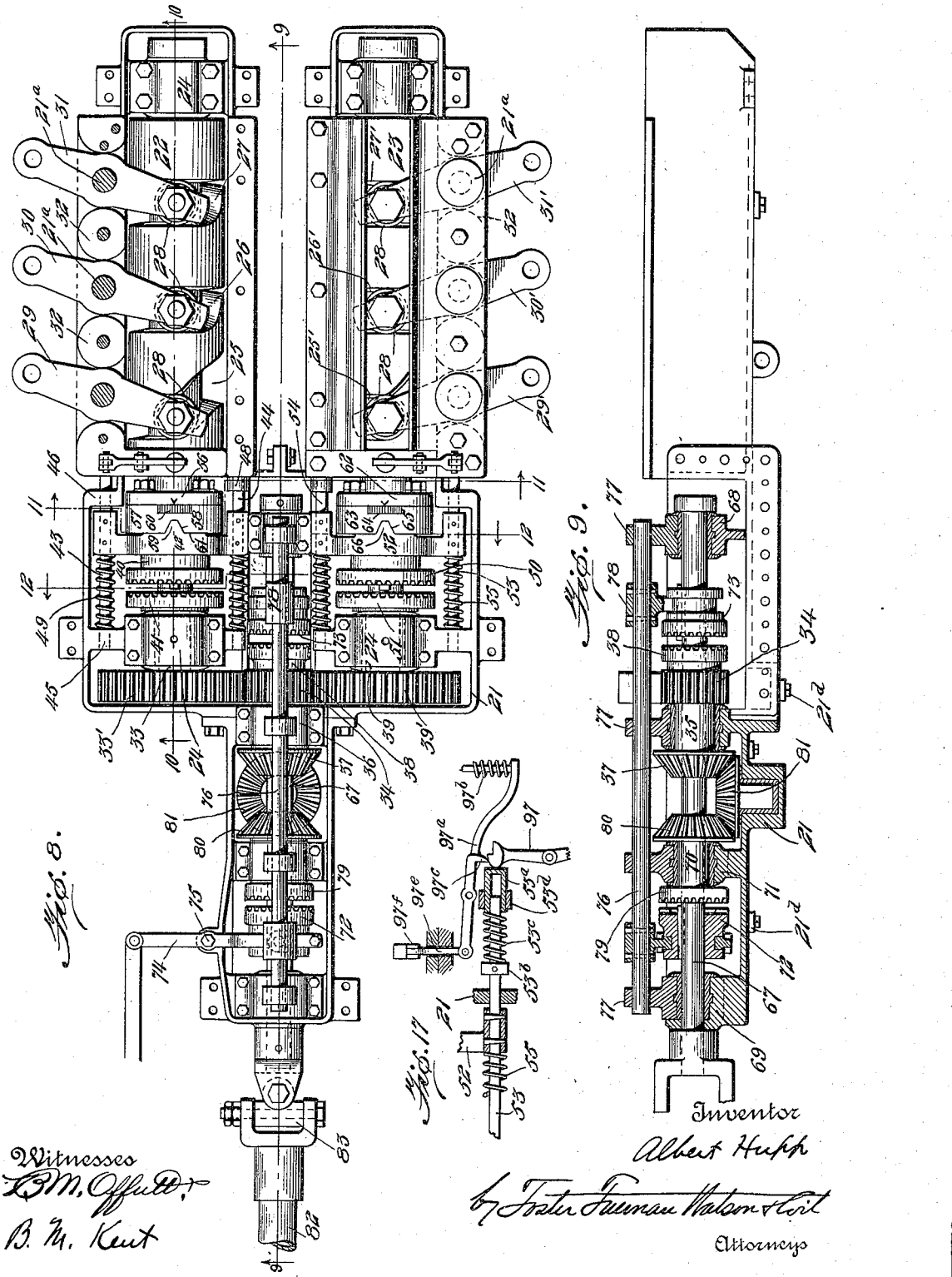

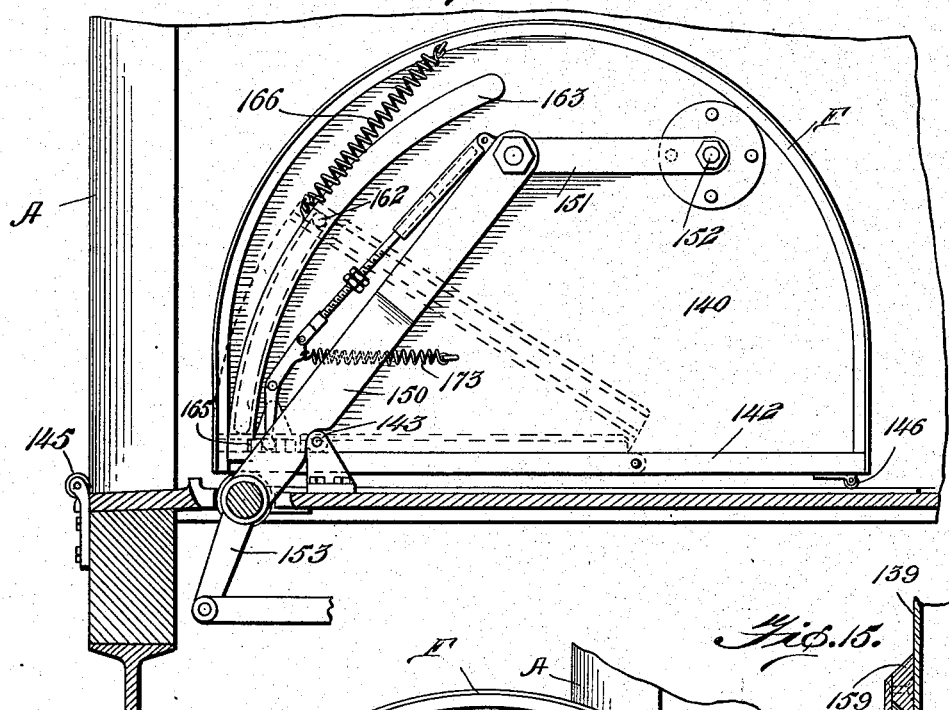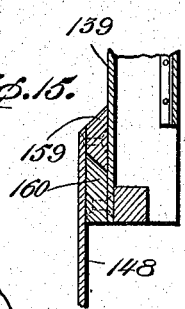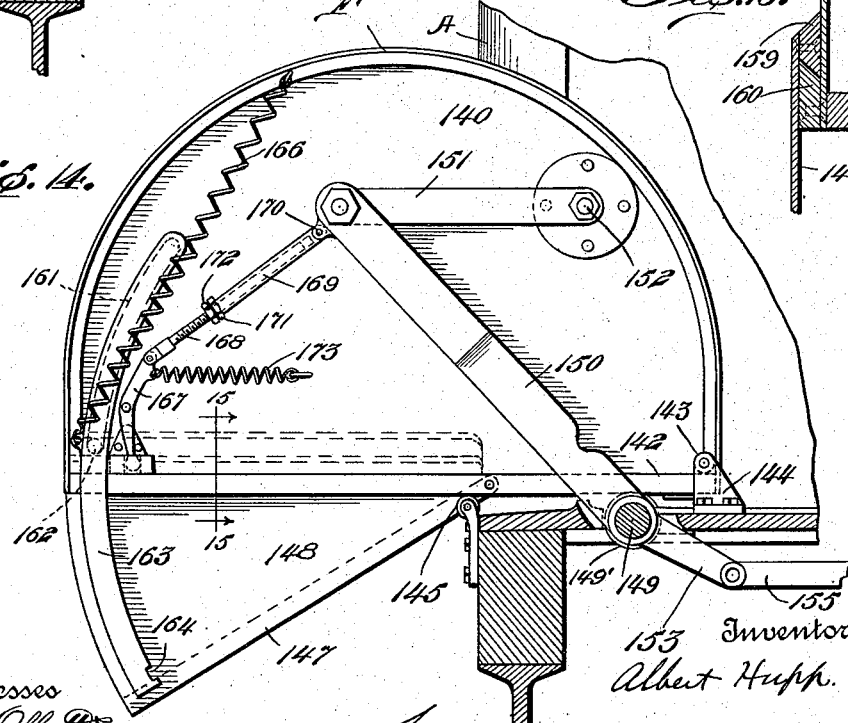

A. HUPP.
AUTOMATIC MAIL EXCHANGE SYSTEM.
APPLICATION FILED MAY 31, 1913.
1,170,267.
Patented Feb. 1, 1916.
8 SHEETS—SHEET 8.
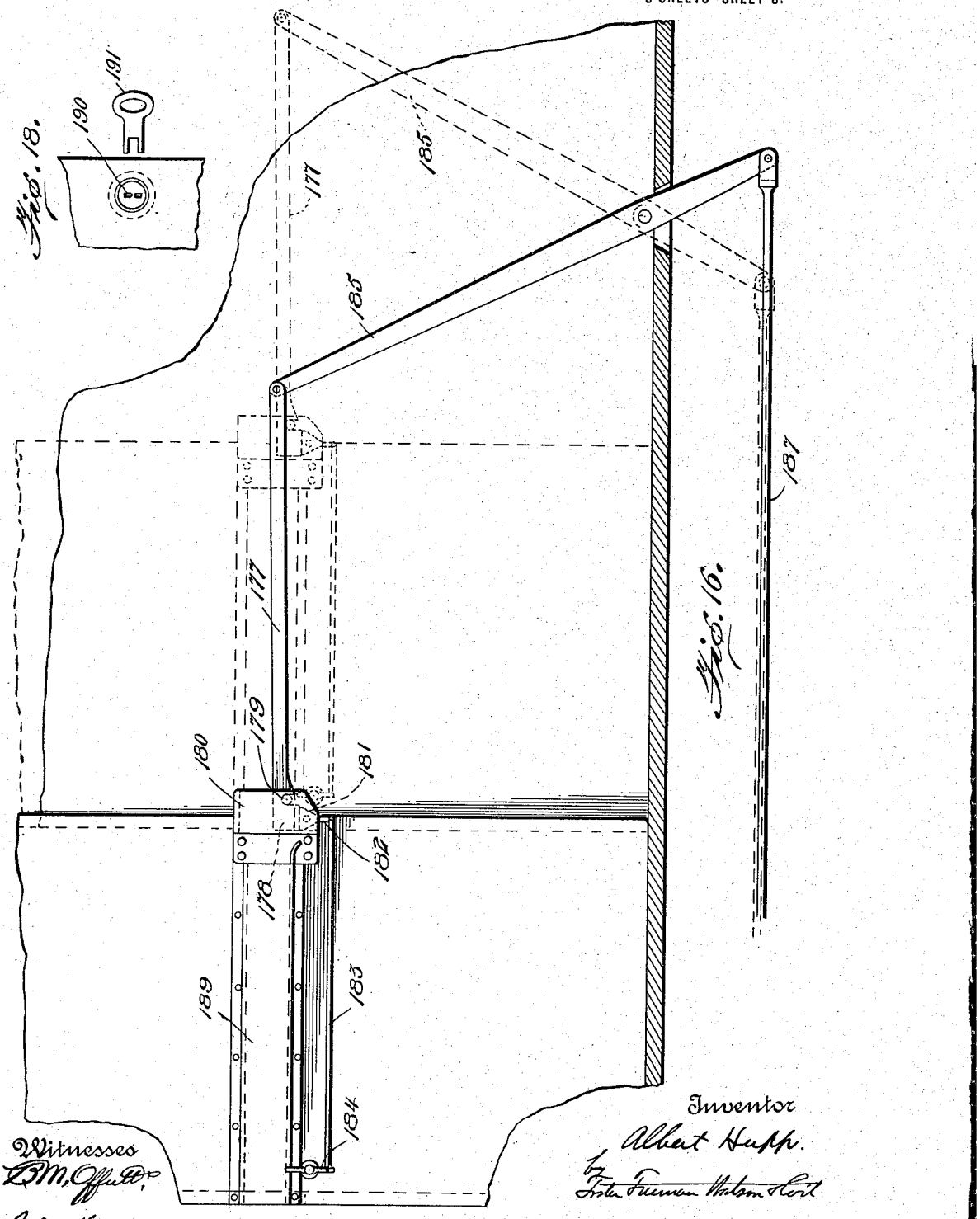

UNITED STATES PATENT OFFICE.

ALBERT HUPP, OF WASHINGTON, DISTRICT OF COLUMBIA.

AUTOMATIC MAIL-EXCHANGE SYSTEM.

1,170,267.  Specification of Letters Patent.  Patented Feb. 1, 1916.

Application filed May 31, 1913. Serial No. 771,041.

*To all whom it may concern:*

Be it known that I, ALBERT HUPP, a citizen of the United States, and resident of Washington, District of Columbia, have invented certain new and useful Improvements in Automatic Mail-Exchange Systems, of which the following is a specification.

This invention relates to mail exchange systems of the type which automatically effect an exchange of mail between a moving train and a station along the line of the railroad and has for its objects generally, the provision of a system of this character which is simple in construction, reliable in operation, and which is capable of receiving and delivering mail with the minimum of liability to damage the same.

A further object is to provide a system which is capable of receiving and delivering mail when the train is traveling at a high rate of speed and which requires so far as its operation is concerned no attention from the mail clerks.

A further object is to provide a system which is automatically set into operation by a suitable trip device located on the roadbed, this trip device and the parts carried by the train, and actuated thereby, being so constructed and arranged that they are not liable to get out of order and are so protected that the mechanism on the car will not be liable to be set into operation by snow or ice, or other obstructions on the roadbed.

A further object is to provide a system which is capable of receiving and discharging quantities of mail as the train is entering or leaving a station at which a stop is made, and to thereby avoid the present loss of time occasioned by the loading and unloading of the mail while the train is standing in the station.

A further object is to provide a system of this character which is capable of simultaneously receiving and discharging mail on opposite sides of the train and so arranged that the mechanism on either side may be readily thrown out of operation at any time when it is not desired to use the same.

A further object is to provide a system which is reversible so that after it has been set into operation it will be possible to return the parts to their original position without going through the complete cycle of operations.

A further object is to provide an improved device for receiving the mail into the car whereby the mail bags will be conducted into the car in a downwardly inclined direction and in which the frictional resistance of the bags on the catcher arm will bring the bags gradually to a position of rest on the floor of the car.

Other objects and the features of novelty of the invention will be apparent from the following description, taken in connection with the accompanying drawings, in which:

Figure 1 is a fragmentary side elevation of a railroad car provided with my improved mechanism; Fig. 2 is a fragmentary plan view of a portion of the mechanism shown in Fig. 1; Fig. 3 is a partial transverse section of the car also showing the station cranes and receiving trough in relation to the car; Fig. 4 is an enlarged plan of the mail receiving mechanism; Fig. 5 is a side elevation of the trip device; Fig. 6 is an enlarged transverse section on the line 6—6 of Fig. 5; Fig. 7 is a detail elevation of the trip arm carried by the truck; Fig. 8 is a plan view of the gearing for operating the mechanisms; Fig. 9 is a section on the line 9—9 of Fig. 8; Fig. 10 is a section on the line 10—10 of Fig. 8; Fig. 11 is a section on the line 11—11 of Fig. 8; Fig. 12 is a section on the line 12—12 of Fig. 8; Fig. 13 is a detail side elevation of the delivering basket when within the car and with the side plate removed; Fig. 14 is a similar view with the basket shown in the extreme outward position where the mail is discharged; Fig. 15 is a section on the line 15—15 of Fig. 14; Fig. 16 is a detail elevation of one of the car doors and showing the actuating arm and the releasing mechanism. Fig. 17 is a detail section of the clutch actuating mechanism; Fig. 18 is a fragmentary detail of the outer side of the door and the key for releasing the door locking mechanism.

Referring to the drawings, A indicates generally the car body, B one of the car trucks, C the railroad rails on which the car wheels run, D the catcher or receiving arm which intercepts and delivers the mail into the car, E one of the station cranes on which the mail is hung and from which it is taken by the arms D, F the delivering or discharging basket which delivers the mail from the car, G the trough which receives the mail from the basket F, and H a trip device located on the roadbed, and adapted to set the car mechanism into operation.

In general the operation of the mechanism is as follows: As the train approaches the station with which mail is to be exchanged, suitable mechanism carried by the car is actuated by the trip device H to set the mechanism into operation for opening the car door, swinging outwardly the catcher arm D and moving the basket F through the open doorway to discharge the mail therefrom, this mechanism being driven by suitable gearing which is operatively connected with an axle of the car. In the practical operation of the system the parts are so arranged that the door is opened while the car is traveling approximately 180 feet from the trip and during the succeeding 180 feet of travel of the car the catcher arm is being swung to the open position and is then held in the open position while the car travels the succeeding 180 feet when it starts to close, and reaches the closed position at the end of the next 180 feet of travel, so that the catcher arm will have been swung to open position, intercepted the mail, and returned to closed position while the car is traveling a distance of 720 feet from the track trip. At a point approximately 210 feet from the track trip the delivering basket is started outward and at a point approximately 390 feet from the trip the basket discharges the mail into the trough G. After discharging the mail the basket immediately starts on its return to the interior of the car and reaches its original position by the time the car reaches a point approximately 570 feet from the track trip. The door is held open, while the car is traveling a distance of approximately 420 feet from the time the door reaches the fully open position, and then starts to close, the closing operation being completed while the car is traveling 180 feet and when it reaches a point approximately 780 feet from the track trip.

All of the operations above described take place automatically and without any attention from the mail clerks and it will therefore be seen that the mechanism will open the car door, effect an exchange of mail with a station, and close the door while the clerk is attending to his usual duties of sorting the mail. It is only necessary for the clerk to deposit the mail bags in the basket F before the train reaches the particular station at which the mail is to be delivered.

A detail description of the various parts of the apparatus will now be given.

*The driving mechanism.*—Arranged beneath the car and supported on suitable beams 20 is a gear casing 21 in which are arranged two cam shafts 22 and 23, these shafts being mounted in suitable bearings 24. Each of these shafts has formed therein three cam grooves 25, 26 and 27 and 25', 26' and 27' respectively. Each of the cam grooves has arranged therein a cam roller 28, these cam rollers being carried by levers 29, 30 and 31 and 29', 30' and 31', which are arranged on pivots $21^a$ in the casing 21, each set of these levers being preferably arranged in the same plane and having arranged between them suitable disks or dust excluding elements 32 which contact with the cylindrically formed central portions of the levers. The shaft 22 has one end rotatably mounted in a tubular member 33, which carries a gear 33', this gear being driven by a gear 34 on a tubular member 35, this member being supported in a suitable bearing 36 and also carrying a bevel gear 37 and a clutch member 38. The shaft 23 has one end similarly arranged in a tubular member 39 which carries the gear 39', this gear also being driven by the gear 34.

The shaft 22 has splined thereon a clutch member 40 which is adapted to engage a mating clutch member 41 arranged on the tubular member 33 so that when these clutch members are in engagement the shaft 22 will be rotated with the gear 33'. The clutch member 40 is movable longitudinally of the shaft 22 by means of a yoke 42 which is supported on rods 43 and 44, the rod 43 being supported in bearings 45 and 46 in the casing 21, and the rod 44 being supported in corresponding bearings 47 and 48. Between the yoke 42 and the bearings 45 and 47, the rods 43 and 44 have arranged thereon springs 49 which are adapted to move the clutch member 40 out of engagement with the member 41.

The shaft 23 has splined thereon a clutch member 50 which is adapted to engage with the clutch member 51 and which is movable longitudinally of the shaft 23 by means of a yoke 52, these parts being similar in arrangement and operation to the clutch members 40 and 41 and the yoke 42. The yoke 52 is carried by rods 53, 54 which are similar in all respects to the rods 43 and 44 respectively and have arranged thereon the springs 55 for the purpose of moving the clutch member 50 out of engagement with the clutch member 51.

The shaft 22 is provided with a flange or collar 56 to which is adjustably bolted a ring 57 having a notch 58 for a tooth 59 on the yoke 42. The ring 57 is preferably provided with a suitable scale 60 which coöperates with an index on the collar 56 for the purpose of facilitating angular adjustment of the ring relative to the collar. The purpose of the tooth 59 is to determine the position of rest of the shaft 22 and also to hold the clutch members 40 and 41 in engagement while the shaft 22 is making a revolution. The mechanism is so arranged that the shaft 22 makes one complete revolution for each cycle of operations of the mail receiving and delivering mechanism, and therefore in order to have these mechanisms properly operate with reference to the station apparatus it is essential to accurately determine the position of rest of the shaft 22. When the yoke 42 is moved for the purpose of effecting the engagement of the clutch members 40 and 41 the tooth 59 is withdrawn from the notch 58 and when the shaft 22 begins to rotate the end of the tooth 59 bears against the surface 61 of the ring 57 and thereby prevents the springs 49 from moving the clutch member 40 out of engagement with the member 41 until the tooth 59 again registers with the notch 58. The shaft 23 is similarly provided with a collar 62 which has adjustably mounted thereon a ring 63 having an index 64 and a notch 65. The yoke 52 is provided with a tooth 66 which coöperates with the notch 65 in the same manner and for the same purpose that the tooth 59 coöperates with the notch 58.

From the foregoing description it will be understood that the shafts 22 and 23 may be driven from the gear 34, either separately or simultaneously.

A shaft 67, rotatably arranged in the tubular member 35, is also supported in bearings 68 and 69 and in a tubular member 70 which is mounted in a bearing 71. The shaft 67 has splined thereon the clutch members 72, 73, the clutch member 72 being moved longitudinally of the shaft 67 by means of a lever 74 which is pivoted on the casing 21 at 75. A rod 76 slidably supported in bearings 77 is operatively connected with the lever 64 so as to move with the clutch member 72. The rod 76 has secured thereto a fork or yoke 78 which engages the clutch member 73 so that the clutch members 72 and 73 will be moved simultaneously by the lever 74. The tubular member 70 carries at one end thereof a clutch member 79 adapted to be engaged by the member 72 for the purpose of locking the tubular member to the shaft 67. The tubular member 70 also carries a bevel gear 80 which meshes with a bevel gear 81 which is journaled in the casing 21 as clearly shown in Fig. 9. The bevel gear 81, in turn, meshes with the bevel gear 37 and therefore when the clutch members 72 and 79 are in engagement the gear 34 will be driven by the shaft 67 through the train of gears 80, 81 and 37. The clutch member 73 is adapted to engage the clutch member 38 and lock the gear 34 to the shaft 67.

The shaft 67 is connected at one end with a telescopic shaft 82 by means of a universal joint 83 and the opposite end of this telescopic shaft, which is preferably square, is connected with a shaft 84 by means of a universal joint 85. The shaft 84 is supported in suitable bearings in a gear casing 86 and is driven from the car axle 87 by means of suitable worm or spiral gearing 88. The shaft 67 will therefore be continuously operated by the car axle, and the universal joints 83 and 85 and the telescopic shaft 82 will permit the requisite movement of the car truck relative to the body of the car which carries the gear casing 21.

When the parts are in the position shown in Figs. 8 and 9 the shaft 67 will rotate freely and no motion will be transmitted to the gears 33' and 39'. When the clutch members 72 and 79 are in engagement the gears 33' and 39' will be rotated in one direction and when the clutch members 38 and 73 are in engagement the gears 33' and 39' will be operated in the reverse direction. When the gears 33' and 39' are operating, the shafts 22 and 23 may be operated by merely throwing into engagement the clutch members 40 and 41 or 50 and 51 respectively. It is therefore possible to operate the shafts 22 and 23 in either direction from the car axle, or to stop the whole mechanism, by shifting the lever 74. For the purpose of conveniently shifting the lever 74 I have provided within the car a hand lever 89 which projects through the floor of the car and is mounted on a pivot 90. The upper end of the lever 89 is arranged in a suitable quadrant 91 which is adapted to hold it in the three requisite positions. The lever 89 preferably swings transversely of the car and has its lower end suitably connected with one arm of the bell crank 92. The other arm of the bell crank 92 is connected with a lever 93 by means of a link 94, and this lever which is pivoted at 95 is connected with the outer end of the lever 74 by means of a link 96. The operation of this lever mechanism will be obvious from the drawings and further description thereof is therefore not believed to be essential.

The clutch members 40 and 50 are preferably shifted by a suitable mechanism located on the roadbed. Referring to Fig. 17, it will be observed that the rod 53 which is connected with the yoke 52 projects from the casing 21 and has it outer end slidably arranged in a cup or sleeve 53$^a$. The rod 53 also carries outside of the casing 21 a collar 53$^b$ between which and the sleeve 53$^a$ is arranged a spring 53$^c$, the tension of this spring exceeding the combined tensions of the springs 55 and therefore being adapted to overpower the latter springs. The sleeve 53$^a$ is adapted to slide in a bearing 53$^d$ and has its outer end in engagement with the upper end of the lever 97 which is pivoted at 98, so that when the lever 97 is actuated by the trip mechanism on the track, the sleeve 53ª will be moved toward the left in Fig. 17, and thereby move the rod 53 and the yoke 52 in the same direction. The clutch member 50 moves with the yoke 52 and when the teeth of the member 50 contact with the teeth of the member 51 the spring 53ᶜ will yield and permit the further movement of the sleeve 53ª. This yielding of the spring 53ᶜ permits the clutch member 51 to rotate sufficiently to bring the teeth thereof into registration with the notches or tooth spaces on the clutch 50 when the spring 53ᶜ will force the clutch members into gripping engagement. A latching lever or detent 97ª is pivotally arranged on the casing 21 above the rod 53 and has its outer end normally pressed downwardly by a spring 97ᵇ to bring the hook 97ᶜ into engagement with the upper end of the lever 97 for a purpose to be hereinafter described.

The lower end of the lever 97 is connected with a lever 99, pivotally mounted on the truck B, by means of a rod 99', and this lever is in turn connected with an arm 100 on a rock shaft 101 by means of a rod 102. The rock shaft 101 is carried by a shaft 101ª which is supported at its opposite ends by brackets 101ᵇ, these brackets being secured to equalizing bars 101ᶜ of truck B by means of suitable clamps 101ᵈ. The rock shaft 101 is held between the collars 101ᵉ which are adjustable on the shaft, 101ª. The rock shaft also carries a downwardly projecting arm 103. The arm 103 has pivotally arranged on its lower end a member 104 which carries a roller 105. The member 104 is arranged immediately in front of the rear wheel of the truck and is so connected with the arm 103 as to be rigid with this arm when pressed toward the right in Fig. 1 and adapted to swing on its pivotal connection with the arm when pressed toward the left. This will be perfectly apparent from the construction shown in Fig. 1. For the purpose of holding the member 104 in position I have provided a spring 106 which is adapted to yield when the member 104 is pressed toward the left as above described. Referring to Fig. 7 it will be seen that the arm 103, the member 104 and the roller 105 are directly above the rail and between the planes of the sides of the truck wheels so that in this position these parts are thoroughly protected by the wheels, and the truck frame, and are not liable to be moved by snow or ice or other obstructions along the roadbed.

In order to move the rod 53 to shift the clutch member 50, the lever 97 is rocked by lifting the arm 103, this being accomplished by the roller 105 engaging the upper surface of the tripping bar 107. This bar is preferably arranged along side of the rail and has one end pivotally mounted on a suitable bracket 108 carried by one of the ties. The upper surface of the bar 107 is inclined upwardly from both ends of the bar to the middle thereof, as clearly shown in Fig. 5 and the free end of this bar is spring supported in any suitable manner. For this purpose I have provided an arm 109 which is pivotally mounted on a bracket 110, this bracket being supported by a suitable frame-work 111 carried by the railroad ties. A powerful spring 112 carried by the frame-work 111 and suitably housed, has its upper end in engagement with the arm 109 and tends to force this arm and the free end of the bar 107 upward.

As the cars pass along the track the wheels engage the upper surface of the bar 107 and depress the same against the pressure of the spring 112, which forces the bar upward as soon as the wheel has passed over the same. When the wheel 105 contacts with the bar the arm 103 will be lifted and thereby actuate the lever 97. The above description covers the trip mechanism on one side of the car and for shifting the clutch member 50. It will be understood that similar mechanism will be provided on the opposite side of the car for shifting the clutch member 40 and that these trip mechanisms are wholly independent in their operation so that they are operable either separately or simultaneously. It will also be understood that one trip mechanism sets into operation the apparatus for receiving and delivering mail through one of the car doors and that there will be as many trip mechanisms and cam shafts similar to the shafts 22 and 23 as there are separate mail receiving and discharging devices. In the drawings I have illustrated the car provided with means for receiving and delivering mail through two doors arranged on opposite sides of the car, but it will be understood that the number of such mechanisms may be increased and that it is only necessary to have one drive shaft, operated by a car axle for all of such mechanisms.

The casing 21, as will be shown from the drawings, is provided with suitable covers 21ᵇ for the different parts of the gearing, these covers being adapted to exclude dust and water from the interior of the casing. The casing is also provided on its interior with numerous partitions and walls 21ᶜ for the purpose of forming separate oil pockets to retain the oil in the different parts of the casing and prevent its running to one part when the car is on a grade. The different oil pockets are preferably provided with suitable drain plugs 21ᵈ by means of which the oil may be drained therefrom whenever desired.

*The mail receiving mechanism.*—For the purpose of catching the mail and delivering the same to the interior of the car I have provided a catcher arm D, this arm being hinged to the car at one side of the door. As illustrated this arm is constructed of a metal plate 113 which is preferably provided on its front face with ribs 114 which are inclined downwardly toward the hinged end of the arm. There will be arranged at the station a suitable frame-work 115 for carrying cranes E of any suitable construction, but preferably of the type shown in my Patent, No. 1,020,610, granted March 19, 1912, these cranes being adapted to hold a mail sack in position to be intercepted by the arm D. As will be seen from Figs. 1 and 3, at 117, the arm D has the lower corner of its forward end cut away for the purpose of clearing the crane E. It will also be observed that each arm D has a plate 118 hinged to its lower edge, this plate being provided on its opposite edge with a flanged roller 119 carried by an arm 119$^a$ which is pivotally arranged on the under side of the plate 118. The roller 119 runs upon a track 119$^b$ arranged on the doorway of the car and the arm 119$^a$ swings as the plate 118 moves to and from its folded position as hereinafter described.

Referring to Fig. 2, it will be seen that one of the arms D is shown in the closed position against the side of the car and the other arm is shown in the open position corresponding to the position shown in Fig. 3. When the arm D is moved to and from the open position the roller 119 moves up and down the track 119$^b$ and the plate 118 is thereby moved into a folded position between the arm D and the side of the car when the arm is in the closed position.

Arranged within the car and in such a position as to be practically a continuation of the arm D is a shield or guide 120 which is rigidly supported at one end on the side of the car and at the other end in any suitable manner as by means of a column 121 and adjustable bolts 122 whereby the position of the guide may be varied. The guide preferably has a hinged connection with the side of the car, as indicated at 123, and also has on its front surface downwardly inclined ribs 124, preferably in substantial alinement with the ribs 114.

In the operation to receive a sack of mail by means of the arm D, the sack will be gradually withdrawn from the crane and its inertia gradually overcome by the friction with the plate 113 and the ribs 114 and with the guide 120 so that by the time the sack leaves the guide 120 it will have acquired a forward velocity equal to that of the car and the sack will then drop to the floor with little or no velocity. The pressure of the sack against the arm D causes the ribs 114 to crease the side of the sack in contact with the arm and thus tend to prevent the sack from dropping. In order to provide for cases of emergency or where the car is moving at a slow speed and the sack would be liable to drop from the arm D before reaching the interior of the car, I have provided the plate 118 which forms a closure or bottom for the space between the arm D and the side of the car and would catch the sacks and prevent their falling to the ground.

For the purpose of actuating the arms D, I arrange at the side of the door a vertical shaft 125 which is supported in suitable bearings and is provided at its lower end with an actuating arm 126. This shaft has secured thereto arms 127, each of which carries at its outer end a pin 128 engaging an elongated slot 129 in a rod 130, which rod is pivoted at one end to the side of the car as indicated at 131 and at the other end carries a pin 132 which is adapted to slide in a slot 133 in a suitable bracket 134 on the back of each arm D, see Fig. 4. The pins 132 on the rods 130 engage the outer ends of the slots 133 when the arms D are in open position and thus firmly support said arms. When the arms 127 are swung in the direction of the arrow in Fig. 4 the pins 128 move along the slots 129 and swing the rods 130 and the arms D inwardly, the pins 132, during this operation, sliding toward the rearward ends of the slots 133. It will be observed that this mechanism is simple and effective for the purpose of operating the arms D and supporting the same in the open position and also leaves the forward side of the arm perfectly free from all obstructions.

The arm 126 on the shaft 125 is connected with a lever 135 by means of a rod 136. The lever 135 is mounted on a suitable pivot 137 and is connected with the lever 30 by a rod 138, see Fig. 2. The lever 30 is rocked by means of a cam slot 26, this slot being so formed as to swing each arm D in the manner hereinbefore described.

*The mail delivery mechanism.*—The delivery basket F is preferably constructed with two substantially semi-circular side plates 139 and 140 which are connected at the rear by a bottom plate 141. The plates 139 and 140 are provided along their lower edges with runners or rails 142 which are engaged on their upper side by suitable rollers 143 carried by brackets 144, secured to the floor of the car. At the outer side of the threshold of the door are arranged rollers 145 which engage the lower surface of the rails 142 and support the basket. Rollers 146 are also secured at the rear of the basket and are adapted to run on the floor of the car to support the basket. From Fig. 14, it will be obvious that when the basket is projected from the car the rollers 143 and 145 coöperate to prevent the same from tilting. The basket is also provided with a hinged bottom plate 147 which is adapted to swing downwardly an angular distance of approximately 30° as shown in Fig. 14. This plate has secured thereto the side plates or wings 148 which closely fit the inner sides of the plates 139 and 140 and thus form substantially a continuation of these sides when the plate 147 is in the position shown in Fig. 14.

In order to move the basket F to and fro through the car door I have provided a shaft 149 which has arranged thereon a pair of arms 150 which project upwardly and are connected with one end of links 151; the opposite ends of these links engaging pins 152 on the outer sides of the plates 139 and 140. Referring to Figs. 13 and 14 it will be obvious that the basket will be moved to and fro by rocking the shaft 149 and for accomplishing this rocking movement I arrange on this shaft a downwardly projecting arm 153 which is connected with one arm of a bell crank 154 by means of a universally jointed connecting rod 155. The bell crank 154 is suitably supported below the car floor and has its other arm connected with a lever 156 by means of a rod 157. The lever 156 is arranged on the pivot 137 and connected with the lever 31 by a rod 158. It will therefore be seen that the rocking of the lever 31 by the cam groove 27 will move the basket F to and fro through the car door.

In order to limit the downward swinging movement of the hinged bottom plate 147, I have arranged on the wings 148 strips 159 which are adapted to engage with strips 160 secured to the inner sides of the plates 139 and 140 (see Fig. 15). The plates 139 and 140 are provided with arcuate slots 161 in which move pins 162 secured to the wings 148 and carrying on the opposite sides of the plates 139 and 140 arcuate bars 163 for a purpose to be hereinafter described. Adjacent the lower ends of the bars 163 they are provided with notches 164 for locking bolts 165 which are suitably supported on the plates 139 and 140 and hold the bottom plate 147 in closed position. Springs 166 are attached to the bars 163 and to the plates 139 and 140 and serve as a means for cushioning the bottom plate 147 when it swings downwardly.

Each of the plates 139 and 140 carries a lever 167, the lower end of which is connected with the bolt 165 for the purpose of actuating the bolt. The upper end of the lever 167 is pivotally connected with one end 168 of a telescopic rod, the other end 169 being pivoted at 170 to the arm 150. The end 168 of the telescopic rod is screw threaded and has arranged thereon the adjustable nut or abutment 171 which is locked in position by a nut 172.

From Figs. 13 and 14, it will be seen that when the basket is moved out of the car the end 169 of the telescopic rod comes into engagement with the abutment 171 and the further movement of the arm 150 swings the lever 167 and withdraws the bolt 165 from the notch 164, thereby permitting the bottom 147 to swing downwardly to the open position shown in Fig. 14. Springs 173 having one end attached to the plates 139 and 140 and their other ends attached to the levers 167 move the bolts 165 into the recesses 164 when the bottom plate 147 is swung into closed position. From Fig. 14 it will be evident that as the basket moves inwardly the bottom plate 147 will be swung to the closed position by the rollers 149' on shaft 149.

In the operation of the basket the bottom 147 remains in the closed position until just prior to the end of the outward movement of the basket when the bolts 165 are withdrawn from the notches 164 and thereby permit the bottom to swing downwardly. It will also be seen from Fig. 14 that the bars 163 close the slots 161 when the bottom is down and also tie the side plates 139 and 140 together.

From Fig. 3 it will be obvious that the sacks of mail will slide from the inclined bottom 147 of the basket and land gently on the inclined surface 174 of the receiving trough G, owing to the proximity of the bottom 147 to this surface. The momentum of the sacks will then carry them down from the surface 174 into the groove 175 of the receiving trough, the inclined surface 176 on the opposite side of the groove preventing them from sliding up over the rear side of the trough. The trough is made of sufficient length to enable the sacks to be brought to rest by frictional resistance and without striking any object in such a manner as to give a severe blow or shock to the contents of the sacks.

*The door operating mechanism.* — The mail cars are usually provided with doors which slide along the side of the car, and for the purpose of automatically opening and closing the doors through which the mail is handled, I provide a bar 177 having a hooked end 178 adapted to engage a pin 179 carried by a casing 180 secured adjacent the rear edge of the door. The casing 180 also carries a triangular cam member 181 which is pivotally mounted therein and provided with an arm 182 which is pivotally connected with one end of a rod 183, the opposite end of this rod being operatively connected with a knob or handle 184 by means of which the cam 181 may be rocked for the purpose of lifting the end 178 of the rod 177 out of engagement with the pin 179.

The rod 177 is pivotally connected with a lever 185 which extends through the floor of the car and is operatively connected with the lever 186 by means of the rod 187.

The lever 186 is mounted on the pivot 137 and adapted to be rocked by the lever 29, with which it is connected by a link 188.

The lever 29 is actuated by the cam groove 25 and opens and closes the car door in the manner hereinbefore described. When it is desired to open the door manually the knob 184 is turned and the cam 181 will lift the end 178 of the rod 177 out of engagement with the pin 179 and permit the door to freely slide to the dotted position shown in Fig. 16. A suitable casing 189 is secured on the door and conceals and protects the rod 177 when the latter is disengaged from the pin 179. The rod 177 and the lever 185 are also shown, in Fig. 16, in the position corresponding to that in which the door is open, this position being indicated by dotted lines.

The rod 177 being in engagement with the pin 179 when the door is in the closed position constitutes a lock for the door which prevents the same from being opened except when the knob 184 is turned to lift the rod 177 out of engagement with the pin 179. In order to provide for opening the door from the exterior of the car the door is formed with a suitable key hole 190 adapted to receive a key 191, this key engaging the knob 184 and being thus adapted to turn the knob.

For the purpose of apprising the mail clerk of the fact that the car has passed a trip which has set the mechanism into operation, I provide a gong 192 of any suitable construction and adapted to be actuated from the lever 100. The details of this gong operating mechanism may be of any desired form and for this purpose I have shown more or less diagrammatically in Fig. 1 the rod 193 which is connected with a lever 194, this lever 194 being in a position to be actuated directly by the arm 100.

For the purpose of enabling the station mechanism to be used by trains traveling in either direction track trips will be arranged on opposite sides of the station and unless suitable means is provided, each of these track trips will lift the arm 103 and sound the gong 192. In order to prevent this double sounding of the gong as the train passes the station I have provided a detent $97^a$, hereinbefore described. This detent latches the lever 97 when the latter has been actuated and prevents this lever as well as lever 103 from returning to its normal position until the car has passed the second trip. The detent is positively held in the position to lock the lever 97 by means of a rod $97^e$ which has its lower end pivotally connected therewith and its upper end pivotally connected with a rocking lever $97^f$, this lever being mounted on a suitable fulcrum $97^g$, and having its opposite end engaged by a vertically movable plunger $97^h$, the lower end of which is arranged in a cam groove $97^i$ which extends circumferentially on the shaft 23 and is provided with a hump or raised portion $97^j$ adapted to lift the plunger $97^h$ and thereby rock the detent $97^c$ to release the lever 97. When the lever 97 is released the arm 103 will be free to swing downwardly to a position where it will engage the tripping bar 107. It will be understood that the mechanism just described will be duplicated for the shaft 22, thus providing similar mechanisms for the opposite sides of the car.

It is believed that the operation of the apparatus as a whole will be clearly understood from the foregoing description without describing in detail the various steps. It is also believed that it will be evident that the invention disclosed herein will accomplish all of the objects for which it has been devised and while I have illustrated and described what I now consider to be the preferred form of embodiment of my invention, I am aware that it is possible to make numerous changes in the details of construction without departing from the spirit of my invention as set forth in the following claims.

Having described the invention what is claimed and desired to be secured by Letters-Patent is, 1. In combination with a car having a door, means for opening the door and for automatically handling mail through the door, reversible gearing driven by an axle of the car, and means, adapted to be actuated by a trip, for operatively connecting said gearing and said first-mentioned means.

2. In combination with a car having a door, means for opening the door and for automatically handling mail through the door, gearing driven by an axle of the car, means, adapted to be actuated by a trip, for operatively connecting said gearing and said first-mentioned means, and means within the car for stopping and reversing said gearing.

3. In combination with a car having a plurality of doors, separate means for opening each of said doors, automatic mail handling means associated with said doors, gearing driven by an axle of the car, and trip actuated means for automatically operating one or more of said door opening means and the mail handling means associated therewith, from said gearing.

4. In combination with a car having a plurality of doors, separate means for opening each of said doors, automatic mail handling means associated with said doors, reversible gearing driven by an axle of the car, and trip actuated means for automatically operating one or more of said door opening means and the mail handling means associated therewith, from said gearing.

5. In combination with a car having doors on opposite sides thereof, means associated with each door for automatically handling mail therethrough, gearing driven by an axle of the car, cams for operating each of said means, and separately operable trip actuated means for automatically operating said cams from said gearing.

6. In combination with a car having doors on opposite sides thereof, means associated with each door for automatically handling mail therethrough, gearing driven by an axle of the car, separately operable trip actuated means for automatically operating said first mentioned means from said gearing, and manually controlled means for reversing said first mentioned means.

7. In combination with a car having doors on opposite sides thereof, means associated with each door for automatically handling mail therethrough, gearing driven by an axle of the car, separately operable cams for actuating said means, and independent trip actuated means for operatively connecting one or more of said cams with said gearing.

8. In combination with a car having doors on opposite sides thereof, means associated with each door for operating and closing the same and for automatically handling mail therethrough, gearing driven by an axle of the car, separately operable cams for actuating each of said means, and independent trip actuated means for operatively connecting one or more of said cams with said gearing.

9. In combination with a car having doors on opposite sides thereof, means for opening and closing each of said doors and for automatically handling mail therethrough, reversible gearing driven by an axle on the car, and independent trip actuated means for automatically operating said first mentioned means from said gearing.

10. In combination with a car and its trucks, of means carried by the car for automatically handling mail, a cam shaft carried on the under side of the car, a plurality of cams on said shaft, means independently connecting each of said cams with said mail handling means respectively, gearing driven by one of the truck axles, and means for operatively connecting said gearing and said cam shaft.

11. In combination with a car, means carried by the car for automatically handling mail, a cam shaft carried by the car and having a plurality of cams thereon for independently actuating said means, gearing driven by an axle of the car, a clutch for operatively connecting said gearing and said cam shaft, trip actuated means for moving the members of said clutch into gripping engagement, and means for disengaging the members of said clutch at the end of a revolution of said cam shaft.

12. In combination with a car, means carried by the car for automatically handling mail, a cam shaft carried by the car and having a plurality of cams adapted to operate said means, gearing driven by an axle of the car, a clutch for operatively connecting said gearing with said cam shaft, trip actuated means for moving the members of said clutch into gripping engagement, spring actuated means for moving the members of said clutch out of engagement and cam means adapted to hold said clutch members in engagement, in opposition to said spring means, until the cam shaft has completed a revolution.

13. In combination with a car having automatically operating mail handling mechanism, an arm carried by the car and adapted to be rocked to set said mechanism into operation, and a trip device arranged on the path of travel of the car and adapted to contact with said arm to rock the same, said trip device comprising a vertically movable horizontally arranged member pivotally supported at one end and spring supported at the other end, and having an inclined upper surface.

14. In combination with a car provided with automatically operating mail handling mechanism, an arm carried by the car and adapted to be rocked to set said mechanism into operation, and a trip device arranged along the path of travel of the car and adapted to contact with said arm to rock the same, said trip device comprising a horizontally arranged member having a pivotal support at one end, a horizontally arranged pivotally mounted arm supporting the opposite end of said bar, and a spring for supporting said last mentioned arm.

15. In combination with a car having automatically operating mail handling means, an arm for actuating said means supported between two longitudinally alined wheels of the car with its lower end slightly above the rail, and a tripping member arranged alongside of the rail and adapted to contact with and move said arm.

16. In combination with a car having automatically operating mail handling means, an arm for actuating said means, pivotally supported between the planes of the sides of two longitudinally alined wheels of the car and with its lower end slightly above the rail, a tripping member arranged alongside of the rail and adapted to be pressed downwardly by the car wheels, and spring means for forcing said member upwardly into position to contact with the lower end of said arm and move the same.

17. In combination with a car having automatically operating mechanism, an arm for actuating said mechanism, a second arm pivoted to the first arm and adapted to move the same when swung in one direction and not move the same when swung in the opposite direction, said second-mentioned arm being arranged between the planes of the sides of two longitudinally alined wheels of the car and with its lower end slightly above the rail, a tripping member arranged alongside of the rail and adapted to be depressed by the car wheels, and spring means for forcing said member upwardly into position to actuate said second-mentioned arm.

18. In combination with a car having automatically operating mechanism, an arm for actuating said mechanism, a second arm pivoted to the first arm and adapted to move the same when swung in one direction and not move the same when swung in the opposite direction, said second-mentioned arm being arranged between the planes of the sides of two longitudinally alined wheels of the car and with its lower end slightly above the rail, a horizontally arranged pivotally supported tripping member having an inclined upper surface and arranged alongside of the rail and adapted to be depressed by the car wheels, and spring means for forcing said member upwardly into position to actuate said second-mentioned arm.

19. In combination with a car, mechanism carried by the car for automatically handling mail, cams for operating said mechanism, gearing driven by one of the car axles and adapted to operate said cams, a clutch device for connecting said gearing and cams, and means for actuating said clutch device comprising a plunger for moving one of the clutch members, a pivotally mounted lever for moving said plunger, trip mechanism for moving said lever, and a latch for holding said lever and plunger in the tripped position.

20. In combination with a car, mechanism carried by the car for automatically handling mail, cams for operating said mechanism, gearing driven by one of the car axles and adapted to operate said cams, a clutch device for connecting said gearing and cams, and means for actuating said clutch device comprising a plunger for moving one of the clutch members, a pivotally mounted lever for moving said plunger, trip mechanism for moving said lever, a latch for holding said lever and plunger in tripped position, and cam means for releasing said latch to permit the plunger and lever to return to their normal position.

21. In combination with a car, means for handling mail, and mechanism for operating said mail handling means and comprising a shaft operatively connected with an axle of the car, a pair of gears loosely arranged on said shaft, clutches for connecting either of said gears with the shaft, a reversing gear connecting said first mentioned gears, and means operable from the interior of the car for simultaneously shifting both of said clutches.

22. In combination with a car having doors on opposite sides thereof, independent mail handling means associated with said doors, and mechanism for operating said mail handling means and comprising separate cam shafts for the receiving and discharging means on each side of the car, a shaft driven by an axle of the car, driving means operatively connected with said cam shafts, and clutch devices for operatively connecting the cam shafts with said driving means.

23. In combination with a car having automatically operated mail receiving and discharging means, mechanism carried by the car for operating said means and comprising a casing, a cam shaft in said casing, gearing for operating said cam shaft, a plurality of levers arranged in the same plane and projecting through the casing and adapted to be rocked by the cam shaft, and means carried by said casing and fitting said levers and adapted to exclude dirt from the interior of the casing.

In testimony whereof I affix my signature in presence of two witnesses.

ALBERT HUPP.

Witnesses:
K. F. SCHWEIZER,
EDWARD C. PYNE.

Copies of this patent may be obtained for five cents each, by addressing the "Commissioner of Patents, Washington, D. C."